US011770701B2

(12) United States Patent
Koniaris

(10) Patent No.: US 11,770,701 B2
(45) Date of Patent: Sep. 26, 2023

(54) SECURE COMMUNICATIONS WITH AUTONOMOUS VEHICLES

(71) Applicant: Argo AI, LLC, Pittsburgh, PA (US)

(72) Inventor: Kleanthes G. Koniaris, San Francisco, CA (US)

(73) Assignee: ARGO AI, LLC, Pittsburgh, PA (US)

( * ) Notice: Subject to any disclaimer, the term of this patent is extended or adjusted under 35 U.S.C. 154(b) by 228 days.

(21) Appl. No.: 17/168,746

(22) Filed: Feb. 5, 2021

(65) Prior Publication Data
US 2022/0256339 A1    Aug. 11, 2022

(51) Int. Cl.
| | |
|---|---|
| H04L 29/06 | (2006.01) |
| H04W 12/03 | (2021.01) |
| H04W 12/06 | (2021.01) |
| H04W 12/04 | (2021.01) |
| H04W 4/46 | (2018.01) |
| B60W 60/00 | (2020.01) |
| B60R 25/01 | (2013.01) |

(52) U.S. Cl.
CPC ............ *H04W 12/04* (2013.01); *B60R 25/01* (2013.01); *B60W 60/001* (2020.02); *H04W 4/46* (2018.02); *H04W 12/03* (2021.01); *H04W 12/06* (2013.01)

(58) Field of Classification Search
CPC ....... H04W 12/04; H04W 4/46; H04W 12/03; H04W 12/06; B60R 25/01; B60W 60/001
See application file for complete search history.

(56) References Cited

U.S. PATENT DOCUMENTS

| | | |
|---|---|---|
| 10,395,332 B1 | 8/2019 | Konrardy et al. |
| 10,748,419 B1 | 8/2020 | Fields et al. |
| (Continued) | | |

FOREIGN PATENT DOCUMENTS

| | | |
|---|---|---|
| CN | 110832569 A | 2/2020 |
| JP | 2020503784 A | 1/2020 |
| (Continued) | | |

OTHER PUBLICATIONS

Alvaro A. Cardenas; Raul Quinonez; Sleiman Safaoui; Tyler Summers; Bhavani Thuraisingham; "Shared Reality: Detecting Stealthy Attacks Against Autonomous Vehicles"; CPSIoTSec '21: Proceedings of the 2th Workshop on CPS&IoT Security and Privacy; Nov. 2021; pp. 15-26 (Year: 2021).*

(Continued)

*Primary Examiner* — Mohammad W Reza
*Assistant Examiner* — Courtney D Fields
(74) *Attorney, Agent, or Firm* — Sterne, Kessler, Goldstein & Fox P.L.L.C.

(57) ABSTRACT

Devices, systems, and methods are provided for communications between autonomous and emergency vehicles. A method may include identifying, by an autonomous vehicle (AV), a first message received from a first vehicle, and identifying, by the AV, in the first message, information associated with identifying the AV, a security key associated with identifying the first vehicle, and an instruction associated with causing the AV to perform an action. The method may include authenticating, by the AV, based on the security key, the first vehicle, and controlling operation, based on the instruction and the information associated with identifying the AV, of the AV to perform the action.

17 Claims, 6 Drawing Sheets

(56) References Cited

U.S. PATENT DOCUMENTS

| | | | |
|---|---|---|---|
| 2015/0334545 A1 | 11/2015 | Maier et al. | |
| 2016/0301698 A1* | 10/2016 | Katara | G06F 16/9554 |
| 2016/0362084 A1 | 12/2016 | Martin et al. | |
| 2018/0006829 A1 | 1/2018 | Kravitz et al. | |
| 2018/0279105 A1 | 9/2018 | Huber et al. | |
| 2019/0041223 A1 | 2/2019 | Yang et al. | |
| 2019/0287409 A1 | 9/2019 | Herbach et al. | |
| 2020/0219197 A1 | 7/2020 | Fields et al. | |
| 2020/0284883 A1 | 9/2020 | Ferreira et al. | |
| 2020/0312136 A1 | 10/2020 | Mondello et al. | |
| 2020/0313908 A1* | 10/2020 | Mondello | H04L 9/30 |
| 2020/0317216 A1* | 10/2020 | Konrardy | B60W 30/182 |

FOREIGN PATENT DOCUMENTS

| | | | |
|---|---|---|---|
| KR | 10-2020-0020344 | 2/2020 | |
| WO | WO-2022233594 A1 * | 11/2022 | H04W 4/12 |

OTHER PUBLICATIONS

Sedjelmaci et al. "A Hierarchical Detection and Response System to Enhance Security Against Lethal Cyber-Attacks in UAV Networks", IEEE Transactions on Systems, Man, and Cybernetics: Systems, Mar. 30, 2017, pp. 1594-1606, vol. 48, issue 9, IEEE, New York, NY.
Goldberg et al. "Jamming and Spoofing Attacks: Physical Layer Cybersecurity Threats to Autonomous Vehicle Systems", Nov. 21, 2016, pp. 1-10, Samuelson-Glushko Technology Law & Policy Clinic (TLPC), Boulder, CO.
Shaikh et al. "Here's How we can Stop Driverless Cars from being Hacked", Aug. 23, 2017, pp. 1-3, Phys.Org, Isle of Man.
Calomarde, Pedro. "Cybersecurity in Self-Driving Cars: Helping to Prevent Hacking", All, Automotive, IoT, Security, Jun. 19, 2017, pp. 1-4, Mouser Electronics, Inc., Mansfield, TX.
International Search Report and Written Opinion of the International Searching Authority directed to related International Patent Application No. PCT/US2022/015289, dated May 13, 2022; 10 pages.

* cited by examiner

SECURE COMMUNICATIONS WITH AUTONOMOUS VEHICLES

TECHNICAL FIELD

This disclosure generally relates to devices, systems, and methods for communications with autonomous vehicles.

BACKGROUND

Autonomous vehicles increasingly are being used. Some situations may require communication with autonomous vehicles. However, some communications with autonomous vehicles, such as when law enforcement or emergency vehicles need to pull over an autonomous vehicle or communicate a need for an autonomous vehicle, currently are not enabled and are not protected from spoofing and other attacks.

Figure 1:
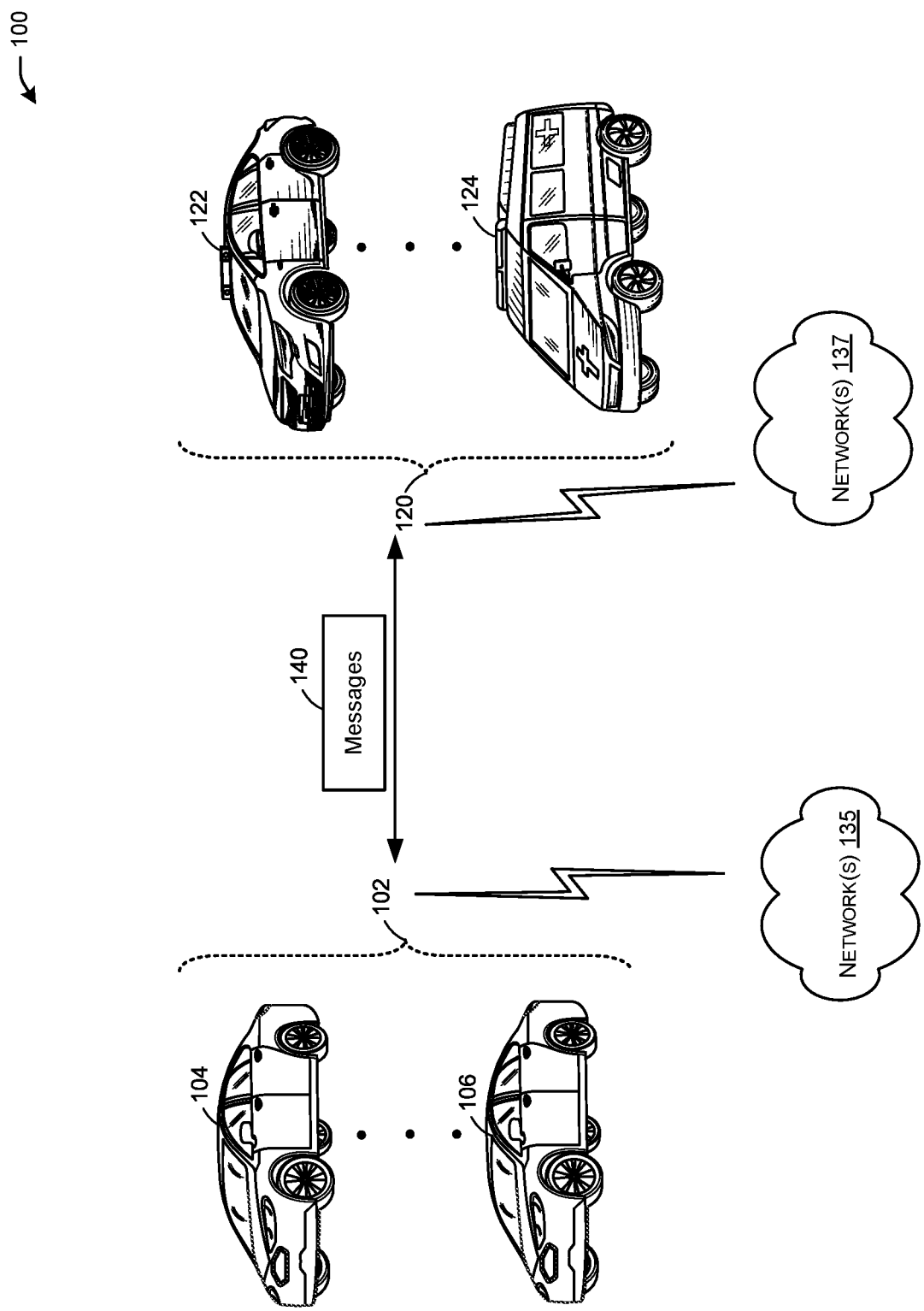
FIG. 1 illustrates an example vehicle environment for autonomous vehicle and emergency vehicle communications, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Autonomous vehicles may be driven in the real world and rely on attached sensors to perform to a certain performance level under environmental factors. As the autonomous vehicles are driven in the real world, sensors rely on accurate detection of signals and communications from other vehicles or devices, such as instructions regarding where to drive and when.

Autonomous vehicles may coexist on the road with traditional (e.g., non-autonomous) vehicles, such as those driven or otherwise controlled by emergency services, law enforcement, and the like. In addition, autonomous vehicles may exist in different vehicle types from different manufacturers. Currently, there is no broadly established communication standard to define communications between autonomous vehicles and non-autonomous vehicles, or to define communications between different types of autonomous vehicles. Therefore, some communications with autonomous vehicles may be undefined and/or insecure, not allowing emergency or law enforcement services to instruct autonomous vehicles to pull over or move over, and risking spoofing or other attacks that may allow nefarious actors to cause autonomous vehicles to perform actions in response to a law enforcement or emergency services impersonators.

There is therefore a need for secure communications with autonomous vehicles.

In one or more embodiments, law enforcement, emergency services, and public safety vehicles may communicate securely with autonomous vehicles to cause the autonomous vehicles to perform actions, such as to pull over, move to the side of the road, respond to messages, lock or unlock doors, and the like. To avoid an attack in which the attacker impersonates law enforcement, emergency services, and public safety officials, the law enforcement, emergency services, and public safety officials (e.g., vehicles) may provide to the autonomous vehicles proof that the officials/vehicles are indeed law enforcement, emergency services, and public safety officials/vehicles, enabling the autonomous vehicles to respond to messages and perform other actions. Herein, law enforcement, emergency services, and public safety officials/vehicles may be referred to collectively as emergency vehicles (EVs).

In one or more embodiments, autonomous vehicles (AVs) and EVs may function as mobile computers that may communicate with each other. To secure the communications, cryptography (e.g., public key cryptography, Transport Layer Security, etc.) may facilitate encryption and decryption of messages between vehicles, tamper detection, device (e.g., vehicle) authentication (e.g., mutual authentication between vehicles), and non-repudiation (e.g., preventing the sender of information from later claiming that the information was never sent). Communications between vehicles may be indirect (e.g., through a cloud network), in which the vehicles may use networks (e.g., cellular, Wi-Fi, etc.) to connect to cloud-based servers to send data to each other. Different types of AVs and EVs may have their own respective servers that may authenticate senders and receivers of messages before transmitting the messages. Vehicles also may communicate directly, such as with peer-to-peer communications (e.g., using a mesh network with hops). In a mesh network example, an EV may send a message to one AV (e.g., one hop), which may forward the message to another AV (e.g., a second hop), and so on. Mesh networks between vehicles may operate even when there is no cellular coverage (e.g., when there is sufficient vehicle density in a given geographic area).

In one or more embodiments, an EV may connect to cloud-based servers via a cellular or other communications network, and may use mutual authentication (e.g., TLS) to ensure that the EV recognizes the authenticity of its cloud-based servers, and that the cloud-based servers recognize the authenticity of the EV (e.g., using public key certificates, in which the EV stores the public key certificates provided by the cloud-based servers and stores its own provisioned public and/or private keys). An AV also may store public and private keys for communications with cloud-based servers and/or EVs.

In one or more embodiments, a message from an EV to an AV may be sent through cloud-based servers (e.g., from EV servers to AV servers) through mutually authenticated TLS and to the AV. Because the servers may authenticate the sender of the message, the entire communication path from EV to servers to servers to AV may be legitimate (e.g., secure). In this manner, when a server receives a message that it cannot authenticate (e.g., cannot determine a valid digital signature for), the server may prevent forwarding of the message to another server and/or to a vehicle.

In one or more embodiments, a message from an EV to an AV may be sent using peer-to-peer communications. AVs may have public key certificates from various public safety agencies along with a standard root of trust mechanism such as when an EV sends a message with the EV's digital signature and associated certificates, AVs may be able to verify that the message is authentic and from the EV. The peer-to-peer message may include the exact date and time at which the message was sent to avoid replay attacks, for example.

In one or more embodiments, a message from an EV to one or more AVs may include AV instructions, such as a request for vehicle information, a request for possible locations to pull over, a request to pull over at a specified location, a request to communicate with AV passengers, a request to lock or unlock parts of the AVs, a request to record using video and/or audio, and the like. The AVs may respond to requests to confirm whether actions have been performed, to deny requests, to provide requested information, and the like.

In one or more embodiments, EVs may identify AVs to which to communicate, allowing the EVs to address specific AVs (e.g., based on vehicle identification numbers, license plates, make/model, location, etc.), or to address any AVs that satisfy certain criteria (e.g., vehicles at a certain location or within a specified distance from the EV, vehicles driving in a particular direction on a particular road, vehicles of a particular make/model, etc.). When the EV's cameras or other sensors identify AV information such as a license plate, make/model, or vehicle identification number (VIN), the EV may include such information in messages so that the cloud-based network routes the message to the proper AV. When the EV does not have access to such information, the EV may request information regarding nearby vehicles (e.g., map information identifying nearby vehicles, etc.). The EV may have access to maps showing AVs, and may match an AV with which the EV intends to communicate to an AV on a map, then may select the AV to reveal the appropriate identifying information that the AV may include in a message to the AV to ensure that the identified AV receives the message. In this manner, AVs may provide and update their position/location information to a cloud-based server. Alternatively, AVs in a given geographical area may be provided a bounding box and report when they are within the bounding box, perhaps subject to certain search properties (e.g., the EV might only be interested in a red vehicle, or it might be interested in every vehicle in the area). The AV might also send the information via a mesh network should there not be connectivity to a cellular network.

In one or more embodiments, vehicles may automate the transmission of messages to other vehicles based on actions or states of a vehicle. For example, when a law enforcement vehicle turns on sirens or flashing lights, the vehicle automatically may send a message to be transmitted to any nearby vehicles (e.g., indicating a request to move to the side of the road), and either the cloud-based network may identify the AVs to receive the message, or the EV may identify the nearby AVs (e.g., using map data) before sending the message.

In one or more embodiments, the use of secure vehicle messaging may allow emergency and law enforcement vehicles to safely and reliably pullover AVs, and to interact with AVs in a way that is consistent with the law (e.g., regarding passengers, privacy, cargo, etc.). For example, EVs may securely communicate with AVs to cause AVs to facilitate vehicle stops or emergency responses, allowing for passenger consent to search an AV, to control the locking or unlocking of the AV (e.g., doors, trunk, glove compartment, etc.). Because the vehicle messaging is secure, the AV and its passengers may respond to EV requests, and passengers may feel confident that the EV requests are legal and safe.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example vehicle environment 100 for autonomous vehicle and emergency vehicle communications, in accordance with one or more example embodiments of the present disclosure.

Referring to FIG. 1, one or more AVs 102 (e.g., AV 104, AV 106) may be in communication with one or more EVs 120 (e.g., EV 122, EV 124). The one or more AVs 102 and the one or more EVs 120 may exchange messages 140 with each other, allowing for the vehicles to authenticate each other, send queries/requests, send commands, send responses/confirmations, and the like.

Figure 3:
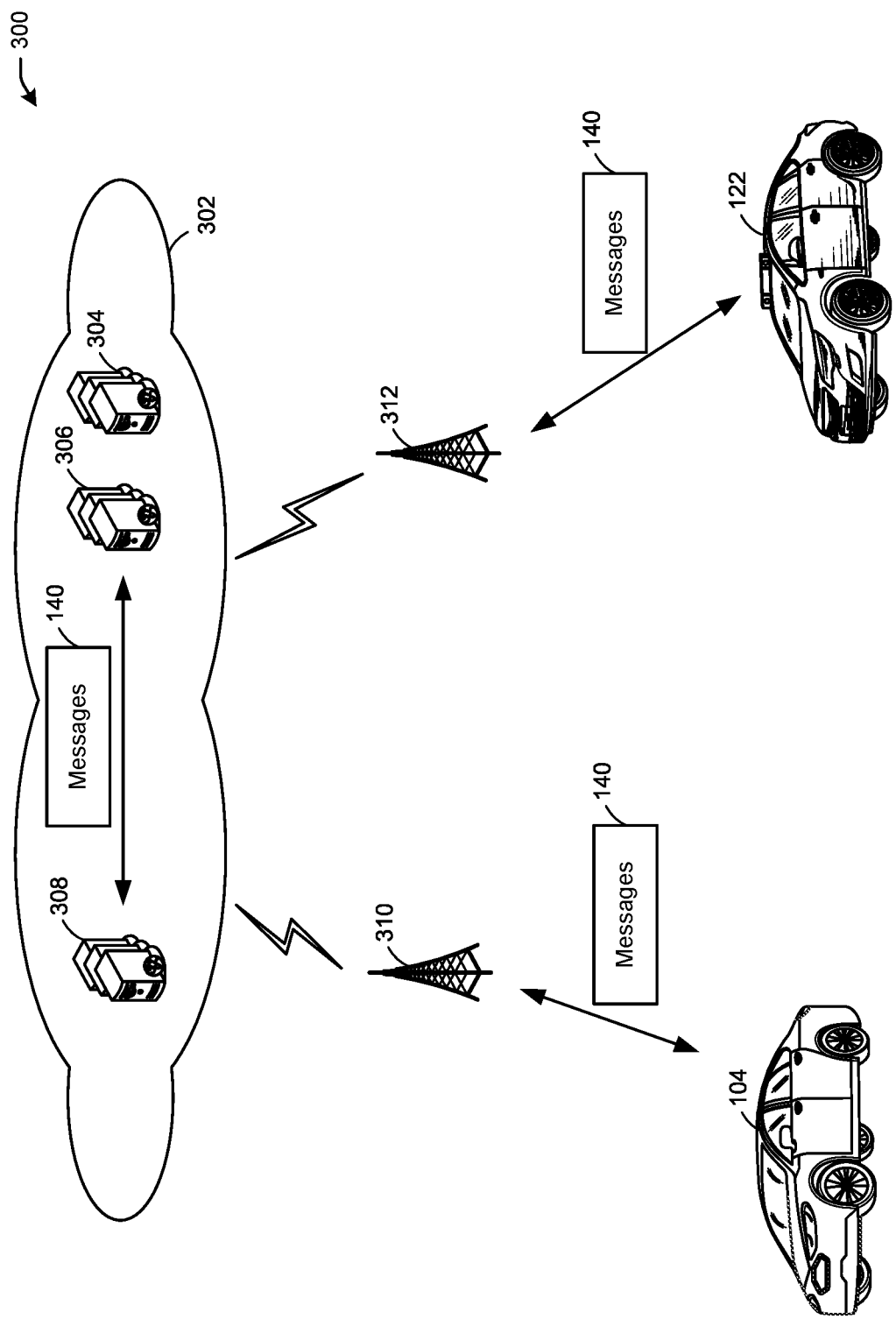
FIG. 3 depicts an example system for autonomous vehicle and emergency vehicle communications, in accordance with one or more example embodiments of the present disclosure.
Figure 4:
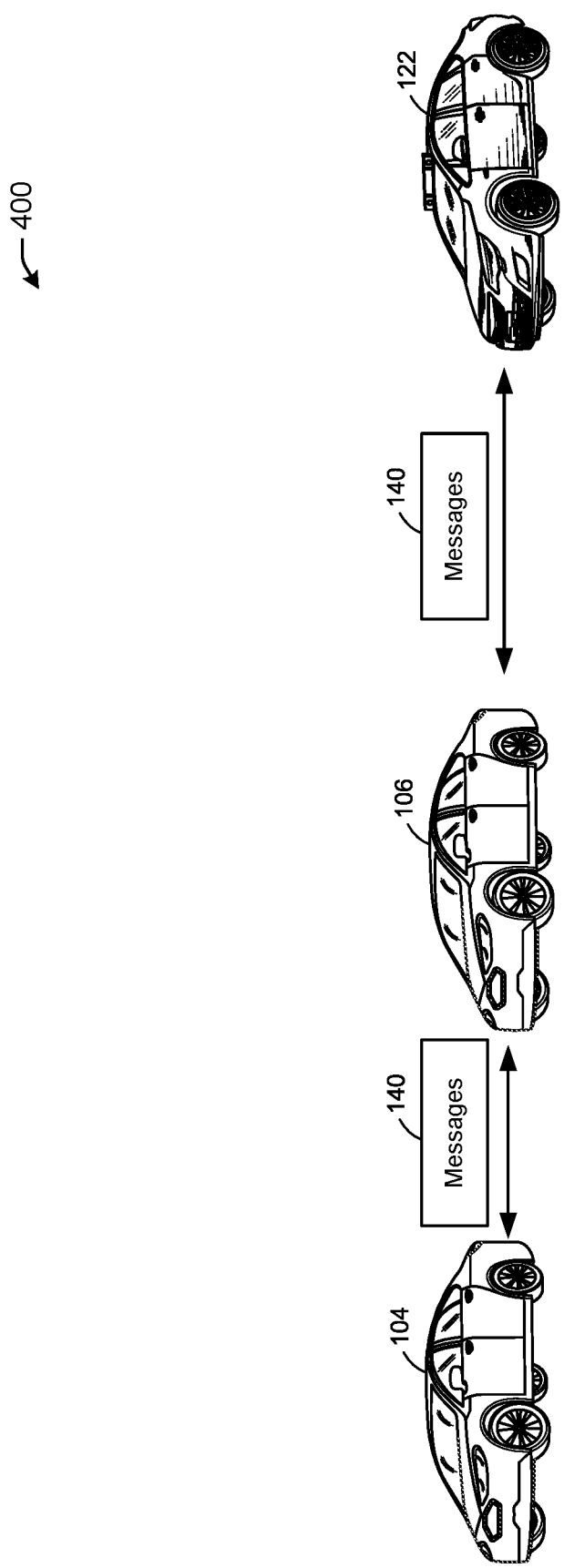
FIG. 4 depicts example communications for autonomous vehicles and emergency vehicles, in accordance with one or more example embodiments of the present disclosure.

In one or more embodiments, the one or more AVs 102 and the one or more EVs 120 may function as mobile computers that may communicate with each other. To secure the communications, cryptography (e.g., public key cryptography, Transport Layer Security, etc.) may facilitate encryption and decryption of the messages 140 between vehicles, tamper detection, device (e.g., vehicle) authentication (e.g., mutual authentication between vehicles), and non-repudiation (e.g., preventing the sender of information from later claiming that the information was never sent). Communications between vehicles may be indirect (e.g., through one or more communication networks 135 and/or 137), in which the vehicles may use networks (e.g., cellular, Wi-Fi, etc.) to connect to cloud-based servers to send data to each other. Different types of AVs and EVs may have their own respective servers that may authenticate senders and receivers of messages before transmitting the messages (e.g., as shown in FIG. 3). Vehicles also may communicate directly, such as with peer-to-peer communications (e.g., using a mesh network with hops, as shown in FIG. 4).

In one or more embodiments, the one or more EVs 120 may use the communications network 135 to send and receive the messages 140, and may use mutual authentication (e.g., TLS) to ensure that the one or more EVs 120 recognize the authenticity of the messages 140 (e.g., using public key certificates, in which the one or more EVs 120 store the public key certificates and stores its own provisioned public and/or private keys). The one or more AVs 102 also may store public and private keys for communications with the one or more EVs 120.

In one or more embodiments, a message (e.g., of the messages 140) from an EV (e.g., of the one or more EVs 120) to an AV (e.g., of the one or more AVs 102) may be sent using the one or more communication networks 135 and/or 137 through mutually authenticated TLS and to the AV. The entire communication path from EV to AV may be legitimate (e.g., secure).

In one or more embodiments, a message (e.g., of the messages 140) from an EV (e.g., of the one or more EVs 120) to an AV (e.g., of the one or more AVs 102) may be sent using peer-to-peer communications. The one or more AVs 102 may have public key certificates from various public safety agencies along with a standard root of trust mechanism such as when an EV sends a message with the EV's digital signature and associated certificates, the one or more AVs 102 may be able to verify that the message is authentic and from the EV. The peer-to-peer message may include the exact date and time at which the message was sent to avoid replay attacks, for example.

In one or more embodiments, a message (e.g., of the messages 140) from an EV (e.g., of the one or more EVs 120) to one or more AVs (e.g., of the one or more AVs 102) may include AV instructions, such as a request for vehicle information, a request for possible locations to pull over, a request to pull over at a specified location, a request to communicate with AV passengers, a request to lock or unlock parts of the one or more AVs 102, a request to record using video and/or audio, and the like. The one or more AVs 102 may respond to requests (e.g., using the one or more messages 140) to confirm whether actions have been performed, to deny requests, to provide requested information, and the like.

In one or more embodiments, the one or more EVs 120 may identify AVs (e.g., of the one or more AVs 102) to which to send the one or more messages 140, allowing the one or more EVs 120 to address specific AVs (e.g., based on vehicle identification numbers, license plates, make/model, location, etc.), or to address any of the one or more AVs 102 that satisfy certain criteria (e.g., vehicles at a certain location or within a specified distance from the one or more EVs 120, vehicles driving in a particular direction on a particular road, vehicles of a particular make/model, etc.). When cameras or other sensors of the one or more EVs 120 identify AV information such as a license plate, make/model, or vehicle identification number (VIN), the one or more EVs 120 may include such information in messages so that the cloud-based network routes the message to the proper AV. When the one or more EVs 120 do not have access to such information, the one or more EVs 120 may request information regarding nearby vehicles (e.g., map information identifying nearby vehicles, etc.). The one or more EVs 120 may have access to maps showing the one or more AVs 102 (e.g., the locations of the one or more AVs 102), and may match an AV with which the one or more EVs 120 intend to communicate to an AV on a map, then may select the AV to reveal the appropriate identifying information that the AV may include in the one or more messages 140 to the AV to ensure that the identified AV receives the one or more messages 140. In this manner, the one or more AVs 102 may provide and update their position/location information to be used by the one or more EVs 120. Alternatively, the one or more AVs 102 in a given geographical area may be provided a bounding box and report when they are within the bounding box, perhaps subject to certain search properties (e.g., the one or more EVs 120 might only be interested in a blue vehicle, or it might be interested in every vehicle in the area). The one or more AVs 102 might also send the information via a mesh network should there not be connectivity to the one or more communication networks 135 and/or 137 (e.g., as shown in FIG. 4).

In one or more embodiments, vehicles may automate the transmission of the messages 140 to other vehicles based on actions or states of a vehicle. For example, when a law enforcement vehicle (e.g., EV 122) turns on sirens or flashing lights, the vehicle automatically may send a message of the messages 140 to be transmitted to any nearby AVs 102 (e.g., indicating a request to move to the side of the road).

Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the one or more AVs 102 and/or the one or more EVs 120 may include one or more communications antennas. The one or more communications antennas may be any suitable type of antennas corresponding to the communications protocols used by the user device(s) 120 one or more AVs 102 and/or the one or more EVs 120. Some non-limiting examples of suitable communications antennas include cellular antennas, Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the one or more AVs 102 and/or the one or more EVs 120.

Any of the one or more AVs 102 and/or the one or more EVs 120 may include any suitable radio and/or transceiver for transmitting and/or receiving radio frequency (RF) signals in the bandwidth and/or channels corresponding to the communications protocols utilized by any of the one or more AVs 102 and/or the one or more EVs 120 to communicate with each other. The radio components may include hardware and/or software to modulate and/or demodulate communications signals according to pre-established transmission protocols. The radio components may further have hardware and/or software instructions to communicate via one or more cellular, Wi-Fi, and/or Wi-Fi direct protocols, as standardized by the Institute of Electrical and Electronics Engineers (IEEE) 802.11 standards, for example. In certain example embodiments, the radio component, in cooperation with the communications antennas, may be configured to communicate via 2.4 GHz channels, 5 GHz channels, 6 GHz channels, 60 GHZ channels, and/or 800 MHz channel. The communications antennas may operate at 28 GHz and 40 GHz. It should be understood that this list of communication channels in accordance with certain technical standards is only a partial list and that other technical standards may be used (e.g., Next Generation Wi-Fi, LTE, or other standards). In some embodiments, other protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, the messages 140 may be transmitted or received using any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications networks 135 and/or 137. In an example, the one or more AVs 102 and/or the one or more EVs 120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the one or more AVs 102 and/or the one or more EVs 120 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 2:
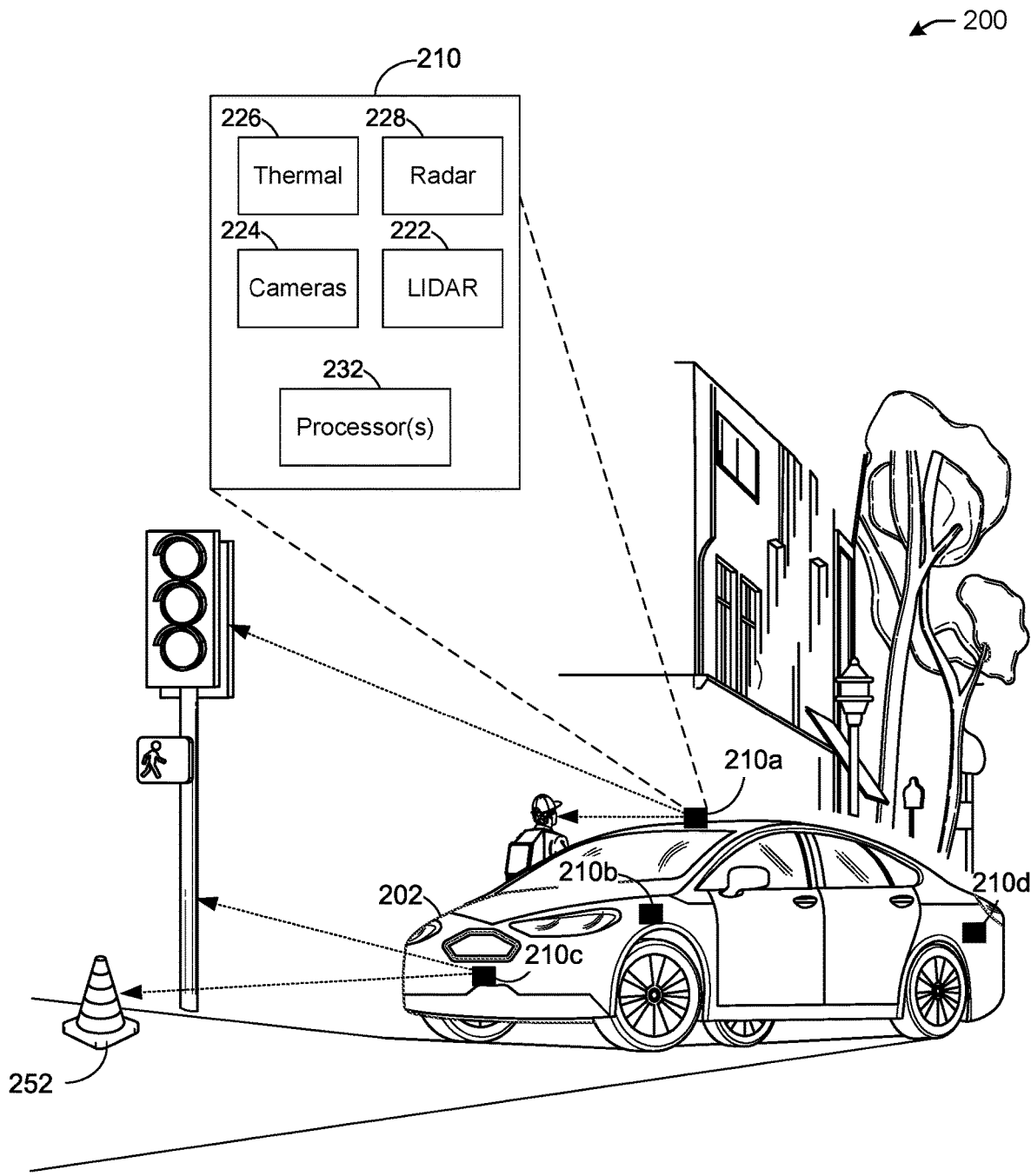
FIG. 2 illustrates an example environment of an autonomous vehicle, in accordance with one or more example embodiments of the present disclosure.

FIG. 2 illustrates an example environment 200 of an AV, in accordance with one or more example embodiments of the present disclosure.

Referring to FIG. 2, there is shown an AV 202 (e.g., similar to the one or more AVs 102 of FIG. 1) having a sensor system 210 for a plurality of cameras, emitters, and sensors. The sensor system 210 may be connected to the AV 202. In this environment 200, there is shown that sensor system 210 includes sensors such as sensors 210a, 210b, 210c, and 210d. It should be noted that other sensors not shown in this figure may also be attached to the AV 202 and that the sensors 210a, 210b, 210c, and 210d are used for illustrative purposes. These sensors may detect objects (e.g., object 252) in the vicinity and around the AV 202. Other emitters and sensors in the sensor system 210 may transmit and/or receive one or more signals in order to detect and/or capture information associated with objects in the vicinity and around the AV 202. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals). In this manner, the one or more AVs 102 of FIG. 1 may include the sensor system 210.

In one or more embodiments, the sensor system 210 may include LIDAR 222. Some examples of a LIDAR may include Geiger mode LIDAR, linear mode LIDAR, large footprint LIDAR, small footprint LIDAR, or the like. The sensor system 210 may include cameras 224 such as stereo cameras that may capture images in the vicinity of the AV 202. The sensor system 210 may include a thermal sensor 226, such as thermistors, resistance temperature detectors, thermocouples, semiconductors, or the like. Further, the sensor system may include a radar 228, which may be any radar that uses radio waves to capture data from objects surrounding the AV 202. The sensor system 210 may also include one or more processors 232. The one or more processors 232 may control the transmission and reception of signals using the LIDAR 222, the cameras 224, the thermal sensor 226, and the radar 228. The various sensors of the sensor system 210, when calibrated correctly, should indicate a proper distance and shape of object 252.

In one or more embodiments, the sensor system 210 may emit multiple pulses (e.g., double and/or triple pulses) for pulse encoding (e.g., range aliasing) or rapid multi-pulse emissions (e.g., non-encoded multi-pulse emissions). For example, multiple pulses of the same and/or varying durations, with delays in between the pulses, may allow for the sensor system 210 to determine whether the return signal (e.g., caused by the reflection of the respective pulses off of an object) is from a current "shot" (e.g., pulse) rather than a return signal of a previous shot (e.g., a return from a further away object reflection). In this manner, pulse encoding may allow for the sensor system 210 to identify, for any return signal, the corresponding pulse that resulted in the respective return signal.

In one or more embodiments, based on the messages 140 of FIG. 1, the sensor system 210 may control operation of the AV 202. For example, when the messages 140 of FIG. 1 indicate a request to change speeds or direction, to pull over, to drive to a particular location, to control locks and/or sensors, and the like, the sensor system 210 may cause the AV 202 to perform the actions.

It is understood that the above descriptions are for purposes of illustration and are not meant to be limiting.

FIG. 3 depicts an example system 300 for AV and EV communications, in accordance with one or more example embodiments of the present disclosure.

Referring to FIG. 3, there is shown AV 104 and EV 122 of FIG. 1. As discussed with reference to FIG. 1, the AV 104 and the EV 122 may exchange the messages 140 using a cloud-based network 302. The cloud-based network 302 may include servers (e.g., server 304, server 306, server 308) to send data to each other and between the AV 104 and the EV 122. Different types of AVs and EVs may have their own respective servers that may authenticate senders and receivers of messages before transmitting the messages. For example, the AV 104 may send the messages 140 to and receive the messages 140 from the server 308 (e.g., using cellular tower 310 of the communication network 135 of FIG. 1), while the EV 122 may send the messages 140 to and receive the messages 140 from the server 306 (e.g., using cellular tower 312 of the communication network 137 of FIG. 1). Software on the servers 306 and 8 may permit the messages 140 from being sent between the AV 104 and the EV 122. Other servers such as the server 304 may be available (e.g., for emergency services, law enforcement agencies, maps, etc.).

In one or more embodiments, the EV 122 may connect to the cloud-based network 302 via the cellular tower 310, and may use mutual authentication (e.g., TLS) to ensure that the EV 122 recognizes the authenticity of the cloud-based servers (e.g., server 304, server 306, server 308), and that the cloud-based servers recognize the authenticity of the EV 122 (e.g., using public key certificates, in which the EV 122 stores the public key certificates provided by the cloud-based network 302 and stores its own provisioned public and/or private keys). The AV 104 also may store public and private keys for communications with the cloud-based network 302 and/or the EV 122.

In one or more embodiments, the messages 140 from the EV 122 to the AV 104 may be sent through the cloud-based network 302 through mutually authenticated TLS and to the AV 104. Because the servers of the cloud-based network 302 may authenticate the sender of the messages 140, the entire communication path from the EV 122 to server 306 to server 308 to AV 104 may be legitimate (e.g., secure). In this manner, when a server receives a message that it cannot authenticate (e.g., cannot determine a valid digital signature for), the server may prevent forwarding of the message to another server and/or to a vehicle.

In one or more embodiments, the messages 140 from the EV 122 to the AV 104 may include AV instructions, such as a request for vehicle information, a request for possible locations to pull over, a request to pull over at a specified location, a request to communicate with AV passengers, a request to lock or unlock parts of the AV 104, a request to record using video and/or audio, and the like. The AV 104 may respond to requests to confirm whether actions have been performed, to deny requests, to provide requested information, and the like.

In one or more embodiments, the EV 122 may identify the AV 104 with to which to communicate, allowing the EV 122 to address specific AVs (e.g., based on vehicle identification numbers, license plates, make/model, location, etc.), or to address any AVs that satisfy certain criteria (e.g., vehicles at a certain location or within a specified distance from the EV 122, vehicles driving in a particular direction on a particular road, vehicles of a particular make/model, etc.). When cameras or other sensors of the EV 122 identify AV information such as a license plate, make/model, or vehicle identification number (VIN), the EV 122 may include such information in the messages 140 so that the cloud-based network 302 routes the messages 140 to the proper AV (e.g., the AV 104). When the EV 122 does not have access to such information, the EV 122 may request (e.g., from the cloud-based network 302) information regarding nearby vehicles (e.g., map information identifying nearby vehicles, etc.). The EV 122 may have access to maps showing AVs, and may match the AV 104 with which the EV 122 intends to communicate to an AV on a map, then may select the AV 104 to reveal the appropriate identifying information that the AV 104 may include in the messages 140 to the AV 104 to ensure that the identified AV 104 receives the message. In this manner, AVs may provide and update their position/location information to a cloud-based server. Alternatively, AVs in a given geographical area may be provided a bounding box and report when they are within the bounding box, perhaps subject to certain search properties (e.g., the EV 122 might only be interested in a red vehicle, or it might be interested in every vehicle in the area).

In one or more embodiments, vehicles may automate the transmission of messages to other vehicles based on actions or states of a vehicle. For example, when a law enforcement vehicle (e.g., EV 122) turns on sirens or flashing lights, the EV 122 automatically may send the messages 140 to be transmitted to any nearby vehicles (e.g., indicating a request to move to the side of the road), and either the cloud-based network may identify the AVs to receive the message, or the EV 122 may identify the nearby AVs (e.g., using map data) before sending the message.

In one or more embodiments, the server 306 and/or the server 308 may store and issue public keys, private keys, and public key certificates to be used in the exchange of the messages 140 for authentication. When the AV 104 or the EV 122 is provisioned (e.g., in a factory), the EV 122 or the AV 104 may generate a public/private key pair. The private key may be stored in a secure on-vehicle memory, and the public key may be provided to one or more servers of the cloud-based network 302, which may provide to the AV 104 and/or the EV 122 a public key certificate as well as the associated public key certificates that form a complete root of trust. The AV 104 and/or the EV 122 may share any of the public key certificates with any other entity and internally use its private key to sign the messages 140 that cannot be "spoofed" by an attacker. The cloud-based network 302 also may provide to the AV 104 and/or the EV 122 public key certificates that have a chain of trust to reveal that the holder of the associated private key (e.g., an the EV 122) in the messages 140 is an appropriate type of EV (e.g., is allowed to send the messages 140 to the AV 102 and is not an attacker).

It is understood that the above descriptions are for purposes of illustration and are not meant to be limiting.

FIG. 4 depicts example communications 400 for autonomous vehicles and emergency vehicles, in accordance with one or more example embodiments of the present disclosure.

Referring to FIG. 4, the AV 104 and the AV 106 of FIG. 1 may be in communication with the EV 122 of FIG. 1. In FIG. 4, the communications (e.g., of the messages 140 of FIG. 1) may be "direct" in that they may not require the cloud-based network 302 of FIG. 3.

In one or more embodiments, the messages 140 from the EV 122 to the AV 104 may be sent using peer-to-peer communications. The AV 104 and the AV 106 may have public key certificates from various public safety agencies along with a standard root of trust mechanism such as when the EV 122 sends the messages 140 with the EV's digital signature and associated certificates, the AVs 104 and 106 may be able to verify that the messages 140 are authentic and from the EV 122. The peer-to-peer messages 140 may include the exact date and time at which the messages 140 were sent to avoid replay attacks, for example. The messages may be sent with multiple "hops" (e.g., a hop between the AV 104 and the AV 106, a hop between the AV 106 and the EV 122, and so on depending on how many vehicles may be between the message sending vehicle and the message receiving vehicle). In one example, the EV 122 may send the messages 140 to the AV 104 through the AV 106 (e.g., the AV 106 receives the messages 140, authenticates the messages 140, and forwards the messages 140 to the EV 122, and vice versa).

In one or more embodiments, the messages 140 from the EV 122 to the AVs 104 and 106 may include AV instructions, such as a request for vehicle information, a request for possible locations to pull over, a request to pull over at a specified location, a request to communicate with AV passengers, a request to lock or unlock parts of the AVs 104 and 106 (e.g., doors, trunks, windows, glove compartments, etc.), a request to record using video and/or audio, and the like. The AVs 104 and 106 may respond to requests to confirm whether actions have been performed, to deny requests, to provide requested information, and the like.

In one or more embodiments, the EV 122 may identify AVs to which to communicate, allowing the EV 122 to address specific AVs (e.g., based on vehicle identification numbers, license plates, make/model, location, etc.), or to address any AVs that satisfy certain criteria (e.g., vehicles at a certain location or within a specified distance from the EV 122, vehicles driving in a particular direction on a particular road, vehicles of a particular make/model, etc.). The EV 122 may include such information in the messages 140. When the EV 122 does not have access to such information, the EV 122 may request information regarding nearby vehicles (e.g., map information identifying nearby vehicles, etc.). The EV 122 may have access to maps showing the AVs 104 and 106, and may match an AV with which the EV 122 intends to communicate to an AV on a map, then may select the AV to reveal the appropriate identifying information that the AV may include in the messages 140 to the AV to ensure that the identified AV receives the messages 140. In this manner, the AVs 104 and 106 may provide and update their position/location information to the EV 122. Alternatively, AVs in a given geographical area may be provided a bounding box and report when they are within the bounding box, perhaps subject to certain search properties (e.g., the EV 122 might only be interested in a red vehicle, or it might be interested in every vehicle in the area). The AVs 104 and 106 might send the information to the EV 122 via a mesh network should there not be connectivity to a cellular network.

Figure 5:
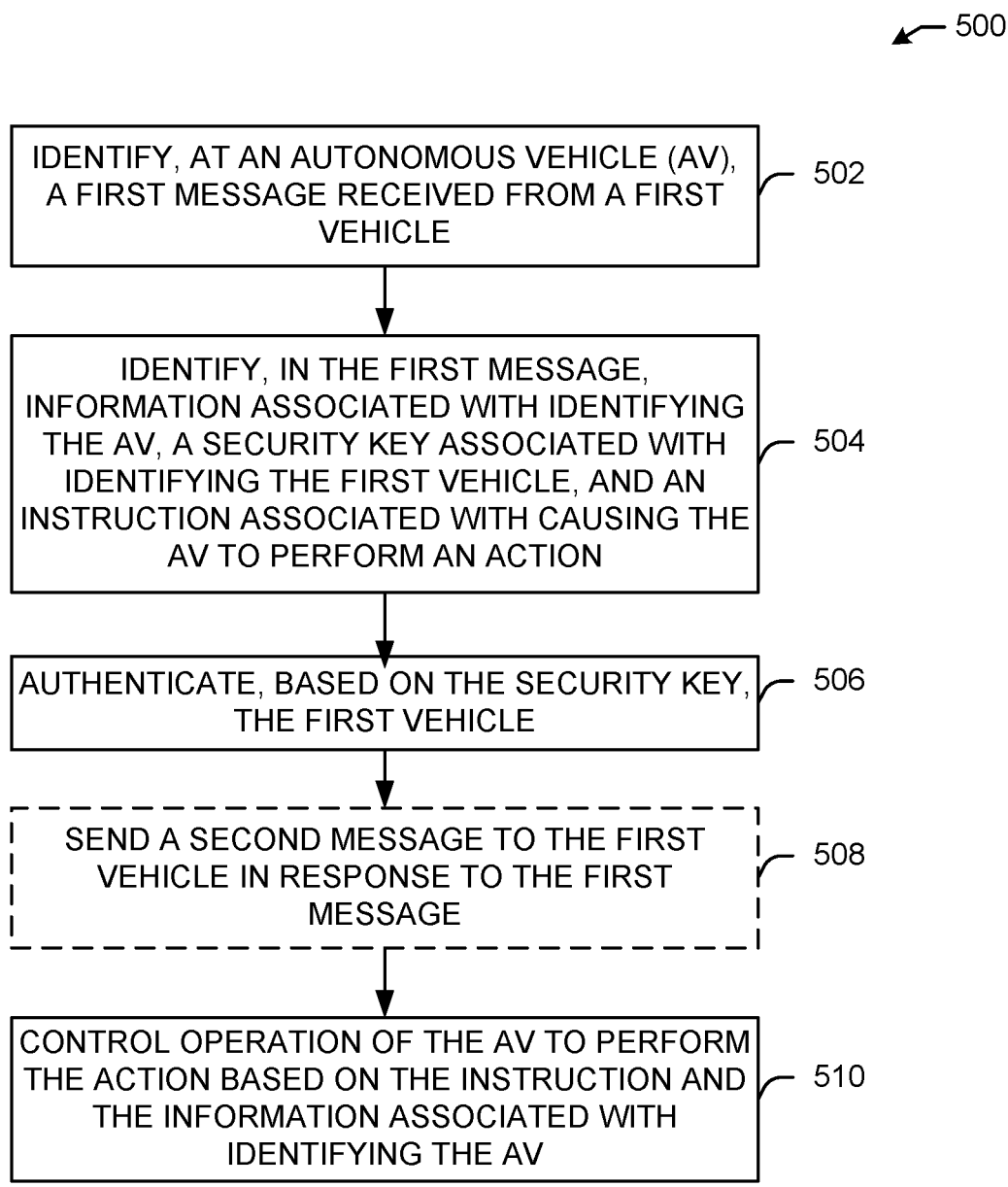
FIG. 5 illustrates a flow diagram of a process for autonomous vehicle and emergency vehicle communications, in accordance with one or more example embodiments of the present disclosure.

FIG. 5 illustrates a flow diagram of a process 500 for autonomous vehicle and emergency vehicle communications, in accordance with one or more example embodiments of the present disclosure.

At block 502, a device (e.g., the sensor system 210 of FIG. 2) of an AV (e.g., the one or more AVs 102 of FIG. 1) may identify a first message (e.g., of the messages 140 of FIG. 1) received from a first vehicle (e.g., the one or more EVs 120 of FIG. 1). The first message may be sent by the first vehicle to request information (e.g., location information, vehicle color/features, a location where the AV may pull over, etc.) and/or to request the device to cause the AV to perform an action, such as to cause the AV to pull over, stop (e.g., reduce vehicle speed to zero), change speeds or directions, drive to a particular location, move the side of the road (e.g., to allow the first vehicle to pass), and the like. The first message may be received from a cloud-based network (e.g., the cloud-based network 302 of FIG. 3) or a direct (e.g., mesh) network (e.g., as shown in FIG. 4). The first message may be received from servers, or from another vehicle (e.g., a hop in a peer-to-peer mesh network as shown in FIG. 4).

At block 504, the device may identify (e.g., detect), in the first message information that may be used to identify the AV, such as the AV's make, model, color, location, VIN, license plate, passengers of the AV, and the like. For example, the first message may indicate the AV and/or any number of additional AV's by providing specific indications of the AVs (e.g., VIN, license plate), and/or may identify the AVs by providing an indication of a location (e.g., within a threshold distance from the first vehicle's geographic location). Because of the AV identifying information, the first message may be properly routed to the device. The device also may identify a security key (e.g., a password and/or security certificate, such as secure socket layer SSL certificates, transport layer security TLS certificates, etc.) that identifies the first vehicle (e.g., the sender of the first message), allowing the device to determine that the security key corresponds to an emergency or law enforcement vehicle, for example, rather than an attacker. The device also may identify, in the first message, an instruction that the device is to execute to cause the AV to perform an action (e.g., provide a response or other information such as vehicle location, pull over, move to the side of the road, lock/unlock doors, turn on or off vehicle sensors, etc.). For example, an EV may have a private security key with identifying information. AVs may have public keys from public safety agencies, for example, and may have access to the private security keys of EVs with which to verify the authenticity of messages sent by EVs.

At block 506, based on the security key, the device may authenticate the first vehicle as a valid (e.g., authorized) sender of the first message (e.g., verify that the first message was received from the first vehicle). To secure the communications, cryptography (e.g., public key cryptography, Transport Layer Security, etc.) may facilitate encryption and decryption of messages between the vehicles, tamper detection, device (e.g., vehicle) authentication (e.g., mutual authentication between vehicles), and non-repudiation (e.g., preventing the sender of information from later claiming that the information was never sent). Communications between vehicles may be indirect (e.g., through a cloud network), in which the vehicles may use networks (e.g., cellular, Wi-Fi, etc.) to connect to cloud-based servers to send data to each other. Different types of AVs and EVs may have their own respective servers that may authenticate senders and receivers of messages before transmitting the messages (e.g., as shown in FIG. 3), and the servers may verify at any server whether the sender and receiver of the first message are valid (e.g., whether security keys and certificates identified with the first message correspond to the proper vehicle). When the security key does not properly identify a valid emergency or law enforcement vehicle such as the first vehicle, the device may disregard and discard the first message, and may refrain from causing the AV to perform the action instructed by the first message.

At block 508, the device optionally may respond to the first message by sending a second message (e.g., of the messages 140 of FIG. 1) to the first vehicle (e.g., using a cloud-based network as in FIG. 3 or using a peer-to-peer network as in FIG. 4). The first message may include a confirmation that the device received the first message, an indication of whether the device authenticated the first vehicle as the sender of the first message, whether the AV will perform the action instructed by the first message, information about the AV such as make, model, color, driving direction, location, and the like.

At block 510, the device may control operation of the AV to cause the AV to perform the action instructed by the first message. For example, the device may generate and send signals that cause the AV to pull over, slow down, change velocity or direction, move to the side of the road, drive to a particular location, activate or deactivate vehicle sensors or other devices, and the like.

Figure 6:
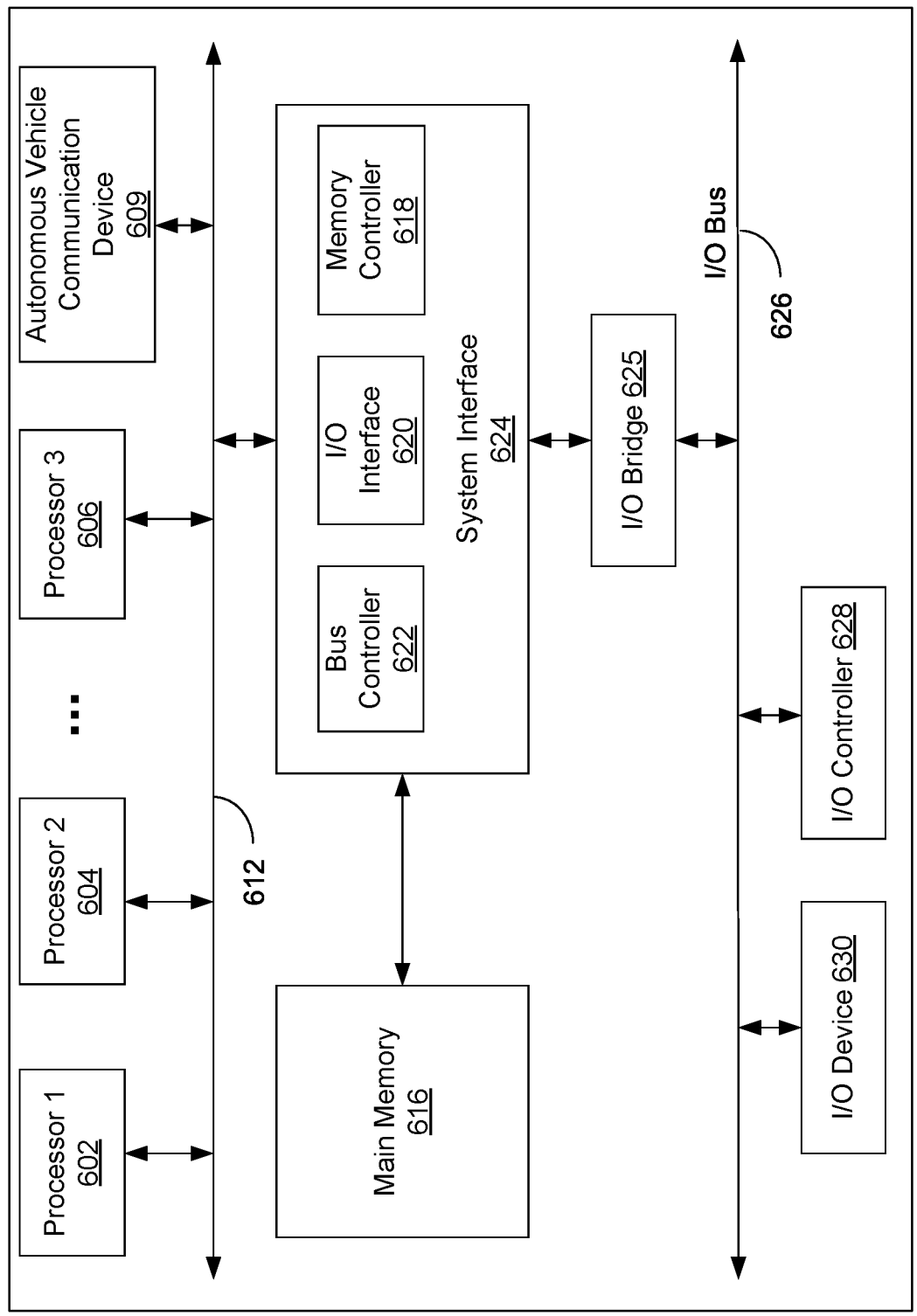
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent one or more processors 232 of FIG. 2, and therefore may facilitate the emission, reception, and processing of pulses and/or other signals. The computer system (system) includes one or more processors 602-606. Processors 602-606 may include one or more internal levels of cache (not shown) and a bus controller (e.g., bus controller 622) or bus interface (e.g., I/O interface 620) unit to direct interaction with the processor bus 612. An AV communication device 609 (e.g., capable of performing the operations of FIG. 5) may also be in communication with the Processors 602-606 and may be connected to the processor bus 612.

Processor bus 612, also known as the host bus or the front side bus, may be used to couple the processors 602-606 and/or the AV communication device with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the AV communication device 609. Another type of user input device includes cursor control, such as a mouse, a trackball, or cursor direction keys for communicating direction information and command selections to the processors 602-606 and/or the AV communication device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the AV communication device 609. Main memory 616 also may be used for storing temporary variables or other intermediate information during execution of instructions by the processors 602-606 and/or the AV communication device 609. System 600 may include read-only memory (ROM) and/or other static storage device coupled to the processor bus 612 for storing static information and instructions for the processors 602-606 and/or the AV communication device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 516 from another machine-readable medium, such as a storage device. Execution of the sequences of instructions contained in main memory 616 may cause processors 602-606 to operate a vehicle or other type of machine (e.g., the sensor system 210 of FIG. 2 may control operation of the AV 202). In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices 506 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for secure communications between autonomous vehicles (AVs) and emergency vehicles (EVs), the method comprising:
   receiving, by at least one processor of an AV, a first message from a first vehicle;
   detecting, by the at least one processor, in the first message, information associated with identifying the AV, a security key associated with identifying the first vehicle, and an instruction associated with causing the AV to perform an action;
   verifying, by the at least one processor, based on the security key, that the first message was received from the first vehicle;
   sending a second message to the first vehicle, the second message comprising:
      a confirmation that the first message was received;
      an indication that the first vehicle was verified as the sender of the first message;
      an indication of performance of the action by the AV;
      a second security key associated with identifying the AV; and
      a second indication of a location where the AV is to perform the action;
   receiving a third message from the first vehicle;
   detecting, in the third message, a confirmation of the location; and
   generating, by the at least one processor, based on the instruction and the information associated with identifying the AV, a signal associated with causing the AV to perform the action at the location based on the confirmation, wherein
   the information associated with identifying the AV is information identified by a camera or sensor of the first vehicle and includes at least one of a license plate number of the AV, a vehicle identification number of the AV, vehicle make information of the AV, vehicle model information of the AV, a location associated with the AV, or a movement direction associated with the AV.

2. The method of claim 1, wherein the action is associated with stopping the AV.

3. The method of claim 1, wherein the action is associated with causing the AV and a second AV to slow down and change a direction of movement.

4. The method of claim 1, wherein the action is associated with causing the AV to activate or deactivate locks.

5. The method of claim 1, wherein the first message is received using a cloud-based network.

6. The method of claim 1, wherein the first message is received using a peer-to-peer mesh network.

7. The method of claim 1, wherein the information associated with identifying the AV in the first message is used by a network to route the first message to the AV.

8. The method of claim 1, further comprising sending geographic information associated with a location of the AV, wherein the first message is received based on the geographic information.

9. The method of claim 1, wherein the verifying that the first message was received from the first vehicle comprises determining that the security key is associated with an emergency vehicle.

10. The method of claim 1, further comprising:
    receiving a second message from a second vehicle;
    detecting, in the second message, a second security key associated with identifying the second vehicle, and a second instruction associated with causing the AV to perform a second action;
    rejecting an authentication of the second security key; and
    discarding the second message.

11. A non-transitory computer-readable medium storing computer-executable instructions which when executed by one or more processors result in performing operations comprising:
    receiving, by a camera or sensor of a first vehicle, information associated with identifying an autonomous vehicle (AV), the information associated with identifying the AV including at least one of a license plate number of the AV, a vehicle identification number of the AV, vehicle make information of the AV, vehicle model information of the AV, a location associated with the AV, or a movement direction associated with the AV;

generating a first message associated with causing the AV to perform an action, the first message comprising the information associated with identifying the AV, a security key associated with identifying the first vehicle, and an instruction associated with causing the AV to perform the action;

sending the first message to the AV;

receiving a second message from the AV, the second message comprising:
  a confirmation that the first message was received;
  an indication that the first vehicle was verified as the sender of the first message;
  an indication associated with performance of the action by the AV;
  a second security key associated with identifying the AV; and
  a second indication of a location where the AV is to perform the action;

generating, by the first vehicle, a third message confirming the location; and sending, by the first vehicle, the third message to the AV, wherein the first message is configured to cause the AV to generate a signal associated with causing the AV to perform the action at the location based on the confirmation.

12. The non-transitory computer-readable medium of claim 11, wherein the information associated with identifying the AV comprises location information associated with identifying the AV and a second AV, wherein the instruction is associated with causing the AV and the second AV to perform the action.

13. The non-transitory computer-readable medium of claim 11, the operations further comprising receiving an input associated with controlling a siren of the first vehicle or lights of the first vehicle,
  wherein the generating the first message is based on the receiving of the input.

14. The non-transitory computer-readable medium of claim 11, the operations further comprising retrieving map data,
wherein the receiving the information associated with identifying the AV is based on the map data.

15. A device for secure communications between autonomous vehicles (AVs) and emergency vehicles (EVs), the device comprising storage coupled to at least one processor, the at least one processor configured to:

receive, by an AV, a first message from a first vehicle;

detect, in the first message, information associated with identifying the AV, a security key associated with identifying the first vehicle, and an instruction associated with causing the AV to perform an action;

verify, based on the security key, that the first message was received from the first vehicle;

send, by the AV, a second message to the first vehicle, the second message comprising:
  a confirmation that the first message was received;
  an indication that the first vehicle was verified as the sender of the first message;
  an indication of performance of the action by the AV;
  a second security key associated with identifying the AV; and
  a second indication of a location where the AV is to perform the action;

receive, by the AV, a third message from the first vehicle;

detect, in the third message, a confirmation of the location;

generate, based on the instruction and the information associated with identifying the AV, a signal associated with causing the AV to perform the action at the location based on the confirmation, wherein the information associated with identifying the AV is information identified by a camera or sensor of the first vehicle and includes at least one of a license plate number of the AV, a vehicle identification number of the AV, vehicle make information of the AV, vehicle model information of the AV, a location associated with the AV, or a movement direction associated with the AV.

16. The device of claim 15, wherein the first message is received using a cloud-based network.

17. The device of claim 15, wherein the first message is received using a peer-to-peer mesh network.

* * * * *